(No Model.)
J. C. SIMMONS.
FENCE.
No. 492,115. Patented Feb. 21, 1893.
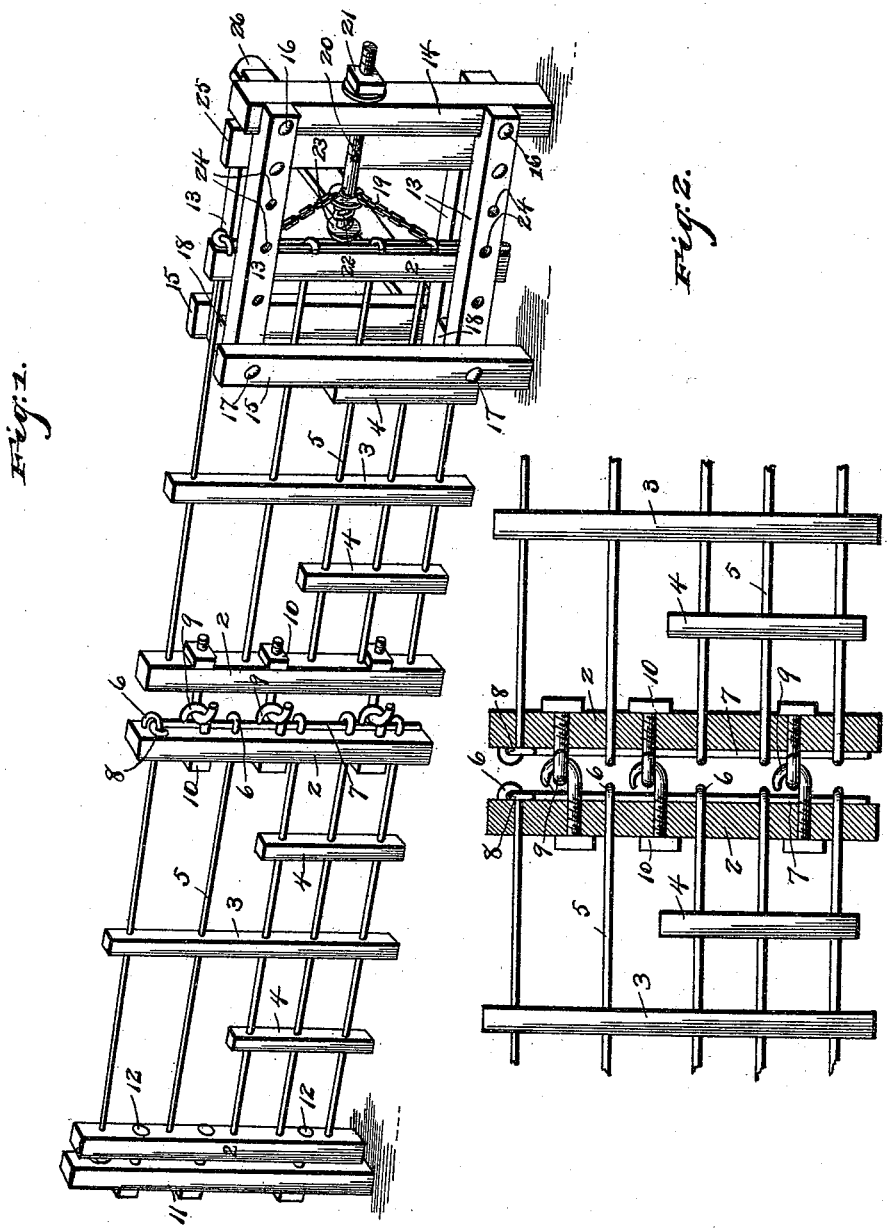
Witnesses
B. S. Ober
N. F. Riley
Inventor
Joseph C. Simmons
By his Attorneys,
C. A. Snow & Co.
THE NORRIS PETERS CO., PHOTO-LITHO., WASHINGTON, D. C.

UNITED STATES PATENT OFFICE.

JOSEPH C. SIMMONS, OF MARTINSVILLE, OHIO.

FENCE.

SPECIFICATION forming part of Letters Patent No. 492,115, dated February 21, 1893.

Application filed October 17, 1892. Serial No. 449,067. (No model.)

*To all whom it may concern:*

Be it known that I, JOSEPH C. SIMMONS, a citizen of the United States, residing at Martinsville, in the county of Clinton and State of Ohio, have invented a new and useful Fence, of which the following is a specification.

The invention relates to improvements in wire fences.

The object of the present invention is to improve the construction of wire fences and to provide simple and effective means for retaining a fence at the desired tension.

The invention consists in the construction and novel combination and arrangement of parts hereinafter fully described, illustrated in the accompanying drawings and pointed out in the claims hereto appended.

In the drawings—Figure 1 is a perspective view of a wire fence constructed in accordance with this invention. Fig. 2 is a detail elevation, partly in section, illustrating the manner of connecting two panels.

Like numerals of reference indicate corresponding parts in all the figures of the drawings.

1, 1 designate fence panels each consisting of vertical end bars 2, intermediate bars 3, and 4, and horizontal fence wires 5, passing through the bars and terminating beyond the end bars 2 in eyes 6, through which pass locking wires 7 arranged vertically and provided at their upper ends with eyes 8 engaging the eyes of the top fence wires. The adjacent panel bars 2 are connected by horizontally disposed hook bolts 9 arranged at intervals with the hooks of each pair engaging the other, and the shanks of the hooks are passed through the bars 2 and are threaded and provided with nuts 10.

The panel bar 2 at one end of the fence is connected with an end fence post 11 by a series of horizontal bolts 12 passing through the fence post and the adjacent panel bar and having their nuts arranged on the outer face of the fence post. The panel bar at the other end of the fence is arranged between parallel horizontally disposed guide bars 13 at the top and bottom of the fence supported by and secured to the outer faces of an end post 14, and to the inner faces of parallel uprights 15. The horizontal bars and the post and uprights form a frame the parts of which are secured together by bolts 16 and 17; and the inner ends of the horizontal bars 13 are spaced by blocks 18, which are arranged on the bolts 17, and are designed to be detached when the end of a panel is placed in the frame and to be replaced after the panel is in position. The panel adjacent to the frame is connected by a chain 19 with an adjusting screw 20, which is provided at its inner end with a head, and which passes through a central opening of the end post 14 and is provided with a nut 21 arranged on the outer face of the end post 14, and adapted to be turned to draw the fence wires to the desired position, a washer being interposed between the nut 21 and the end post 14 to receive the wear. On the inner end of the bolt is arranged a spring 22 which is spirally coiled around the bolt or screw 20, and which is interposed between the head of the screw and the chain 19 to compensate for expansion and contraction of the fence wires. The ends of the chain 19 extend through the adjacent end bar of the panel, and a washer or disk 23 is arranged at the end of the spring adjacent to the chain to provide a proper bearing to enable the chain to bear equally on the spring. The horizontal parallel bars 13 are provided with a series of registering perforations 24, and an adjustable board 25 is provided, which is designed to close the space between the fence post 14 and the adjacent panel should it be necessary, and is secured in place by bolts adapted to pass through any of the perforations 24 of the horizontal bars. The frame is braced at one side thereof by an inclined brace 26 secured to the frame by the lower bolt 17 of the uprights 15, and the upper bolt 16 of the end post 14.

It will be seen that the fence is simple, strong and durable, that it is adapted to be quickly erected, and that it may be maintained at the desired tension without liability of the fence wires being broken by contraction and expansion.

Instead of employing hook-bolts 9, horizontal bolts 12 could be employed to connect the adjacent parts 2, and I desire it to be understood that various changes in the form, proportion, and the minor details of construction may be made without departing from the principle or sacrificing any of the advantages of the invention.

What I claim is—

1. In a fence, the combination of a frame comprising parallel horizontal bars, uprights supporting the inner ends of the horizontal bars, spacing blocks interposed between the inner ends of the horizontal bars, and an end post having a central opening and supporting the outer ends of the horizontal bars, a fence panel having one end arranged in the frame, a chain having its ends secured to the fence panel, and an adjusting screw connected at its head with the chain and passing through the opening of the end post and provided with a nut, substantially as described.

2. In a fence, the combination of a frame comprising horizontal parallel bars arranged in pairs and each provided with a series of perforations, uprights supporting the inner ends of the bars, a fence post supporting the outer ends of the horizontal bars and provided with a central opening, a panel having one end arranged in the frame, a chain having its ends connected with the panel, an adjusting screw passing through the opening of the end post and provided at its outer end with a nut and connected near its head with a chain, a spring interposed between the head of the screw and the chain, and the adjustable board arranged in the space between the end post and the panel, substantially as described.

In testimony that I claim the foregoing as my own I have hereto affixed my signature in the presence of two witnesses.

JOSEPH C. SIMMONS.

Witnesses:
LEWIS PFISTER,
GEORGE G. HARRIS.